United States Patent
Udo et al.

(10) Patent No.: US 12,184,145 B2
(45) Date of Patent: Dec. 31, 2024

(54) BREATHING DEVICE AND ELECTRIC POWER STEERING DEVICE

(71) Applicant: Mitsubishi Electric Corporation, Tokyo (JP)

(72) Inventors: Toyoaki Udo, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 575 days.

(21) Appl. No.: 16/980,595

(22) PCT Filed: Jul. 5, 2018

(86) PCT No.: PCT/JP2018/025575
§ 371 (c)(1),
(2) Date: Sep. 14, 2020

(87) PCT Pub. No.: WO2020/008605
PCT Pub. Date: Jan. 9, 2020

(65) Prior Publication Data
US 2021/0057958 A1    Feb. 25, 2021

(51) Int. Cl.
*H02K 5/10* (2006.01)
*B60R 16/02* (2006.01)
(Continued)

(52) U.S. Cl.
CPC ........... *H02K 5/10* (2013.01); *B60R 16/0207* (2013.01); *B62D 5/046* (2013.01); *H02K 5/225* (2013.01);
(Continued)

(58) Field of Classification Search
CPC ............ H02K 5/10; H02K 5/22; H02K 5/225; H02K 11/30; H02K 11/33; H02K 2205/09;
(Continued)

(56) References Cited

U.S. PATENT DOCUMENTS 5,592,038 A * 1/1997 Gaspar ..................... H02K 5/10
310/58
5,650,677 A * 7/1997 Furukawa ................ H02K 5/10
310/58
(Continued)

FOREIGN PATENT DOCUMENTS

EP    2371673 A2 * 10/2011 ........... B62D 5/0406
FR    2841525 A1 *  1/2004 ........... B62D 5/0406
(Continued)

OTHER PUBLICATIONS

Kichise, machine translation of jp2016158454, Sep. 2016 (Year: 2016).*
(Continued)

*Primary Examiner* — Eric Johnson
(74) *Attorney, Agent, or Firm* — Sughrue Mion, PLLC; Richard C. Turner

(57) ABSTRACT

A breathing device includes a ventilator, which is arranged on an end surface of the control unit provided with a connector on an opposite side of an output shaft of a rotating machine so as to protrude from an inside of the electric power steering device toward an outside of the electric power steering device, and is configured to provide a breathing action through ventilation between the inside and the outside. The ventilator protrudes in a horizontal direction or upward with respect to the horizontal direction.

2 Claims, 8 Drawing Sheets

(51) Int. Cl.
  *B62D 5/04* (2006.01)
  *H02K 5/22* (2006.01)
  *H02K 11/33* (2016.01)

(52) U.S. Cl.
  CPC ......... *H02K 11/33* (2016.01); *H02K 2205/09* (2013.01)

(58) Field of Classification Search
  CPC ........ B62D 5/046; B62D 5/04; B62D 5/0403; B62D 5/0406; B60R 16/0207
  See application file for complete search history.

(56) References Cited

U.S. PATENT DOCUMENTS

| | | | |
|---|---|---|---|
| 5,914,415 A * | 6/1999 | Tago | B01D 19/0031 96/13 |
| 2005/0115727 A1 | 6/2005 | Sakata | |
| 2009/0047890 A1 | 2/2009 | Yano et al. | |
| 2015/0236570 A1* | 8/2015 | Hayashi | H02K 11/30 310/71 |
| 2016/0181885 A1 | 6/2016 | Yamasaki | |
| 2016/0280249 A1 | 9/2016 | Enomoto | |
| 2016/0361676 A1* | 12/2016 | Zaiki | H05K 5/03 |
| 2017/0282965 A1 | 10/2017 | Sekikawa | |
| 2019/0199175 A1* | 6/2019 | Kanazawa | B62D 5/046 |
| 2021/0323600 A1* | 10/2021 | Nakano | H02K 5/10 |

FOREIGN PATENT DOCUMENTS

| | | | | |
|---|---|---|---|---|
| JP | 2002-079950 A | | 3/2002 | |
| JP | 2004032930 A | * | 1/2004 | ........... B62D 5/0406 |
| JP | 2004-320844 A | | 11/2004 | |
| JP | 2005-132165 A | | 5/2005 | |
| JP | 2010015901 A | * | 1/2010 | |
| JP | 2016-119799 A | | 6/2016 | |
| JP | 2016158454 A | * | 9/2016 | |
| JP | 2016-194464 A | | 11/2016 | |
| JP | 2017-177996 A | | 10/2017 | |
| WO | WO-2019240146 A1 | * | 12/2019 | ........... B62D 5/0406 |

OTHER PUBLICATIONS

Fujimoto, Machine Translation of FR2841525, Jan. 2004 (Year: 2004).*
Fujimoto, Machine Translation of JP2004032930, Jan. 2004 (Year: 2004).*
Takehara, machine translation of jp2010015901, Jan. 2010 (Year: 2010).*
Extended European Search Report dated Jun. 10, 2021 from the European Patent Office in Application No. 18925627.4.
International Search Report for PCT/JP2018/025575, dated Sep. 11, 2018.

* cited by examiner

BREATHING DEVICE AND ELECTRIC POWER STEERING DEVICE

CROSS REFERENCE TO RELATED APPLICATIONS

This application is a National Stage of Application No. PCT/JP2018/025575 filed Jul. 5, 2018.

TECHNICAL FIELD

The present invention relates to a breathing device configured to provide a breathing action, and to an electric power steering device.

BACKGROUND ART

Hitherto, some devices such as electric power steering devices and motor generators including a rotating machine and a control unit integrated with each other are mounted to a vehicle in the vicinity of a rack shaft outside a cabin. In such devices, in order to secure waterproofness, methods such as application of a sealing material and installation of an O-ring are employed not only as the waterproof structure for the rotating machine and the control unit but also as the waterproof structure for connection surfaces of the rotating machine and the control unit.

Incidentally, when such a device has the sealed structure for complete waterproofness, the air inside the device expands due to generation of heat from the rotating machine or the control unit, and the air inside the device shrinks when the device is cooled thereafter. Such a load deteriorates the waterproof structure, and hence the structure for promoting a breathing action is required.

Therefore, as a related art, there has been known an electric power steering device which is configured to prevent clogging of a breathing hole and a filter to improve ventilation efficiency of a case, and is configured to reduce a pressure difference between an outside and an inside of the case when the temperature and pressure in the case rapidly increase (see, for example, Patent Literature 1).

CITATION LIST

Patent Literature

[PTL 1] JP 2005-132165 A

SUMMARY OF INVENTION

Technical Problem

According to the above-mentioned technology disclosed in Patent Literature 1, a case forming a breather includes a breathing hole provided with a filter. This filter is water-repellent, and thus is impermeable to water but permeable to air. Therefore, the filter provides a certain level of waterproofness against water spray such as rain. However, there is such a problem that the filter alone cannot maintain sufficient waterproofness unless a way of use is devised in an environment in which a pressure difference equal to or larger than that expected according to a standard specification occurs due to, for example, a temperature difference equal to or larger than a difference determined in advance.

The present invention has been made to solve such a problem, and has an object to provide a breathing device capable of improving waterproofness, and an electric power steering device.

Solution to Problem

In order to achieve the above-mentioned object, a breathing device according to one embodiment of the present invention includes a ventilator, which is provided to an electric power steering device, and is arranged so as to protrude from an inside of the electric power steering device to an outside of the electric power steering device, the ventilator being configured to provide a breathing action through ventilation between the inside and the outside, the electric power steering device being mounted to a vehicle and including a rotating machine and a control unit configured to drive the rotating machine, which are integrated with each other so as to have waterproof structure, wherein the ventilator protrudes in a horizontal direction or upward with respect to the horizontal direction.

Advantageous Effects of Invention

According to the present invention, through employment of the above-mentioned configuration, the breathing device can improve the waterproofness.

DESCRIPTION OF EMBODIMENTS

Now, with reference to drawings, a detailed description is given of a breathing device and an electric power steering device according to the present invention with several embodiments.

First Embodiment

Figure 1:
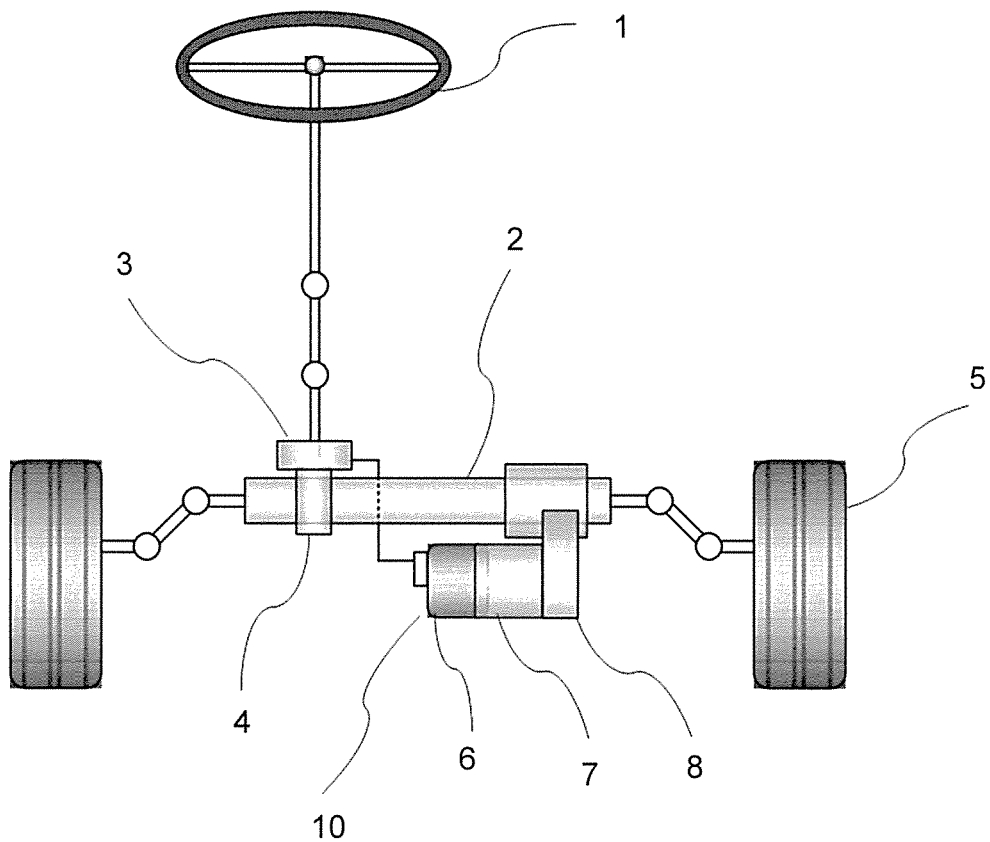
FIG. 1 is a schematic view for illustrating a main part of a vehicle to which an electric power steering device according to a first embodiment of the present invention is mounted.

FIG. 1 is a schematic view for illustrating a main part of a vehicle to which an electric power steering device 10 according to a first embodiment of the present invention is mounted.

Referring to FIG. 1, the main part of the vehicle includes a steering wheel 1, a rack shaft 2, a torque sensor 3, a pinion 4, tires 5, and the electric power steering device 10. The torque sensor 3 among these components is mounted to a column extending from the steering wheel 1, and is configured to detect a steering torque by a driver. The electric power steering device 10 has the waterproof structure formed through integration of a motor 7, which is a rotating machine, and a control unit 6, and is configured to mesh with a gear 8 along a rack shaft 2.

The electric power steering device 10 is mounted at a position closer to the ground than the rack shaft 2 along the rack shaft 2. Compared with the case in which the electric power steering device 10 is mounted to a portion above the rack shaft 2 as in the case of the torque sensor 3, when the electric power steering device 10 is mounted at the position close to the ground, higher waterproofness are essentially required in specifications.

Figure 2:
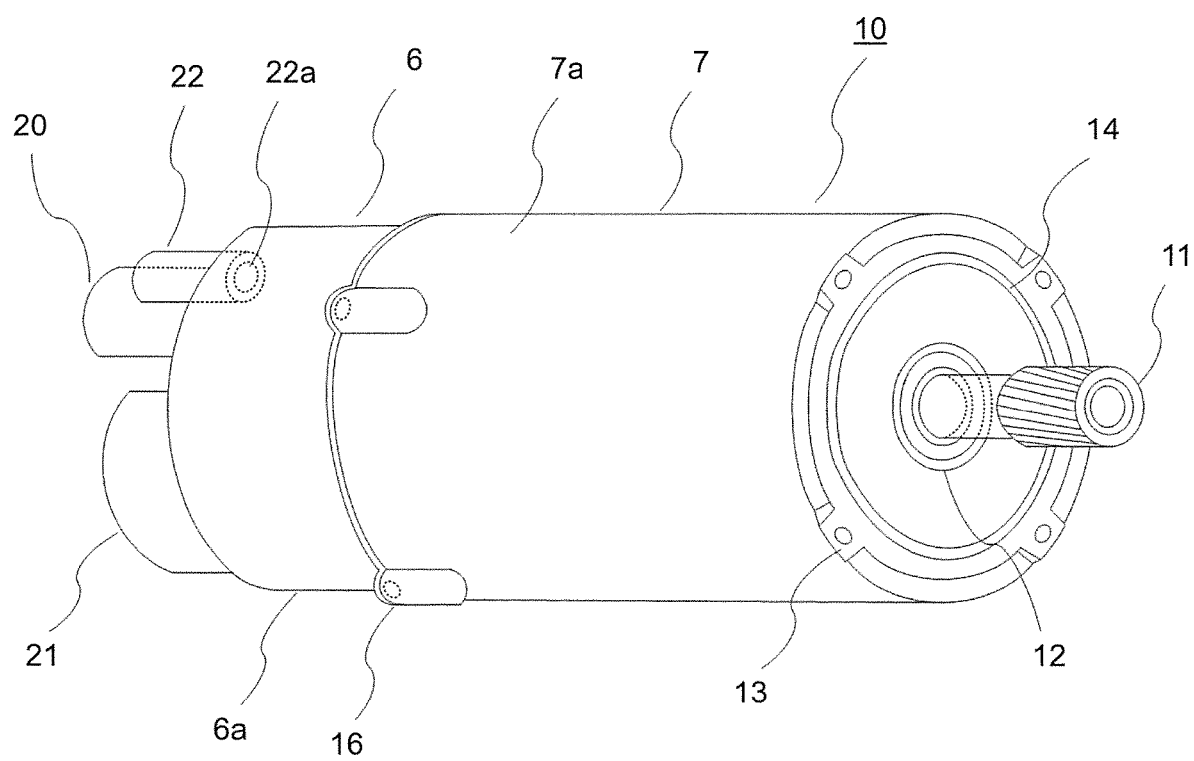
FIG. 2 is a partially transparent perspective view for illustrating the basic structure of the electric power steering device illustrated in FIG. 1.

FIG. 2 is a partially transparent perspective view for illustrating the basic structure of the electric power steering device 10.

Referring to FIG. 2, in the electric power steering device 10, the motor 7 incorporates a stator, windings, a rotor, and the like in a motor housing 7a, as is publicly known. A distal end of an output shaft 11 protruding from an end surface meshes with the gear 8 of the vehicle. The motor housing 7a is made of metal, and has a bottom on a right side of FIG. 2 and an opening on a left side. Therefore, the entry of water from a side surface of the motor 7 illustrated in FIG. 2 can completely be blocked.

When the motor 7 is mounted to the gear 8 of the vehicle, motor mounting portions 13 provided at four positions and the gear 8 are fixed to each other by fastening with screws. The motor mounting portions 13 may be provided at three positions depending on a mounting direction. In this case, the waterproofness between the motor 7 and the gear 8 is secured by fitting an O-ring to an O-ring groove 14 formed on a radially inner side of the motor mounting portions 13.

A bearing 12 is mounted at a base portion of the output shaft 11 in a surface of the motor mounting portions 13 on a radially inner side of the O-ring groove 14. The bearing may have the non-waterproof structure or the waterproof structure. In the case of the waterproof structure, for example, it is only required that the O-ring be mounted on an outer periphery and that a seal member obtained by affixing rubber to an outer periphery of a metal plate be mounted to each of an inner ring and an outer ring. With such structure, a breathing passage is eliminated between an inside and an outside of this bearing 12. Moreover, when the waterproof structure is not employed in the bearing 12, the waterproof performance may be secured through installation of an oil seal on the gear side of the bearing 12.

Meanwhile, the control unit 6 integrally coupled to the motor housing 7a incorporates, for example, a circuit network and the like in a case 6a made of an insulation resin material. The motor housing 7a and the case 6a are mounted to each other so as to form the waterproof structure by fastening with screws at three positions of mounting portions 16, and further, for example, applying a gasket or a sealing material to inner walls on contact surfaces of the motor housing 7a and the case 6a. A power supply connector 20 and a signal connector 21 including a torque sensor 3 are formed integrally with the case 6a in a rear end portion of the control unit 6.

When the electric power steering device 10 is driven, both of the motor 7 and the control unit 6, which serves to control the drive of the motor 7, generate heat. Particularly, in order to radiate the heat generated inside the control unit 6 when the motor 7 is driven, there is provided the structure in which a heat radiation member is arranged so as to transfer the heat also to the motor 7 and the motor components.

Incidentally, most of structures of the motor 7 itself are made of metal, and the entire motor 7 thus also serves as a heat radiation member. When the motor 7 is driven, the air expands due to the generation of heat in the electric power steering device 10. In contrast, when the electric power steering device 10 is cooled while driving of the vehicle is stopped, the air becomes negative in pressure and thus shrinks. Therefore, the structure configured to provide a breathing action is required for the electric power steering device 10.

For that purpose, in the electric power steering device 10, a breathing device 22 is arranged at a position close to the power supply connector 20 and the signal connector 21 on an end surface of the control unit 6 on the side opposite to the output shaft 11 of the motor 7. The breathing device 22 includes a ventilator which protrudes from an inside of the electric power steering device 10 to an outside of the electric power steering device 10, to thereby be capable of ventilation. The breathing device 22 is configured to provide the breathing action through ventilation between the inside and the outside of the electric power steering device 10. It is only required that the ventilator protrude basically in a horizontal direction or upward with respect to the horizontal direction, and may be considered as a tubular chimney in terms of functionality.

In the arrangement of the breathing device 22, when the breathing device 22 is mounted to a lowest portion of the vehicle, there is a risk in that the entire electric power steering device 10 may be submerged due to, for example, traveling in a puddle. In consideration of this point, it is preferred that the breathing device 22 be arranged at a position as high as possible on the end surface of the control unit 6.

It is preferred that the breathing device 22 include a water-repellent filter 22a mounted on an inner side of the electric power steering device 10. The water-repellant filter 22a can prevent the entry of water into the control unit 6 when the water enters the breathing device 22.

Figure 3:
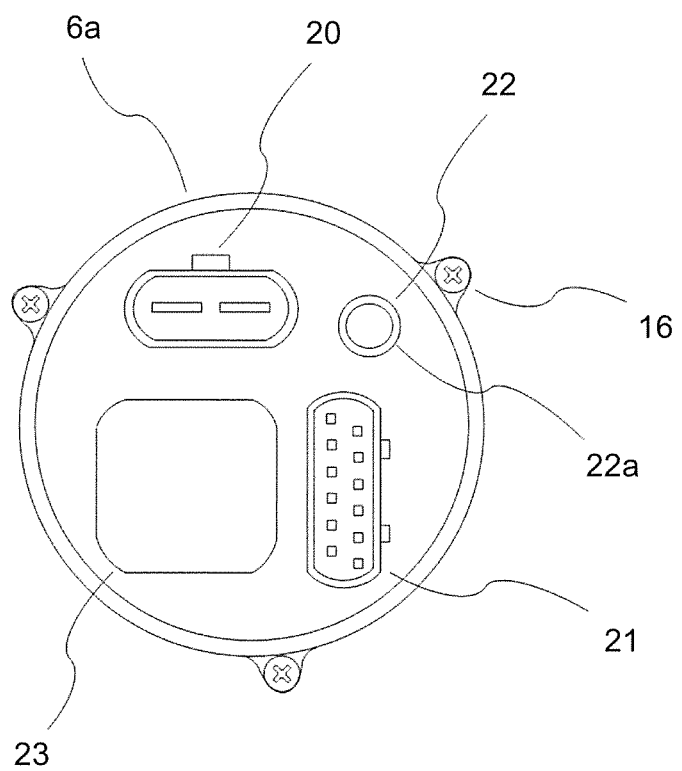
FIG. 3 is an end view for illustrating the electric power steering device illustrated in FIG. 2 as seen from a control unit side.
Figure 4:
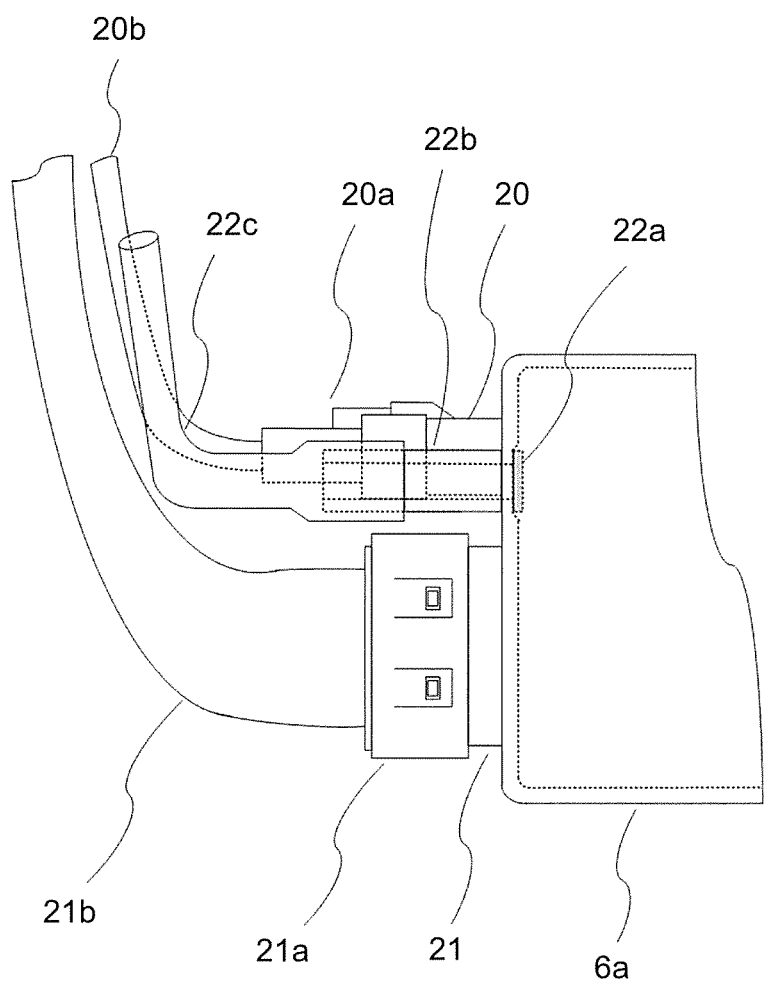
FIG. 4 is a partially cutaway side view for illustrating the electric power steering device illustrated in FIG. 2, with vehicle members, as seen from a side-surface side of the control unit.

FIG. 3 is an end view for illustrating the electric power steering device 10 as seen from the control unit 6 side. FIG. 4 is a partially cutaway side view for illustrating the electric power steering device 10, with vehicle members, as seen from a side-surface side of the control unit 6.

Referring to FIG. 3, the breathing device 22 is arranged at a substantially middle position between the power supply connector 20 and the signal connector 21 on the end surface of the electric power steering device 10 on the control unit 6 side. Moreover, a large-component accommodation portion 23 configured to incorporate large components such as a noise filter and a capacitor, which are difficult to be incorporated in the control unit 6, is provided in a diagonal direction of the breathing device 22.

The power supply connector 20 includes two terminals on a plus side and a minus side. Sectional areas of the terminals are set to be large so that a large current for driving the motor 7 can be supplied. In contrast, in the signal connector 21, a large number of small terminals are arranged so as to be used for inputting information on the vehicle side such as that from the torque sensor 3 and vehicle speed and outputting transmission signals from the control unit 6. A ventilation hole is formed at the center of the breathing device 22 so as to be capable of ventilation.

Referring to FIG. 4, in the electric power steering device 10, moreover, a vehicle-side connector 20a is connected to the power supply connector 20, and a harness 20b is further connected to the vehicle-side connector 20a. A vehicle-side connector 21a is connected also to the signal connector 21, and a harness 21b, which is a signal line, is further connected to the vehicle-side connector 21a. All of these connectors have waterproof specifications.

The mounting position of the electric power steering device 10 to the vehicle is on the lowest layer, and hence all of the vehicle side connectors 20a and 21a and the harnesses 20b and 21b are connected so as to extend upward. Incidentally, the torque sensor 3 is illustrated in FIG. 1, and other components such as a battery and a vehicle speed sensor are arranged above the rack shaft 2. Therefore, the harnesses 20b and 21b extend upward.

In the breathing device 22, when the water-repellant filter 22a is to be mounted, it is only required that the water-repellant filter 22a be mounted so as to cover the hole formed in a part of an inner peripheral surface of the case 6a. Moreover, a ventilator 22b of the breathing device 22 extends so as to protrude on the outer side of the case 6a. The structure that includes the ventilator 22b as a part and is further extended can be employed. For example, a pipe, a tube 22c, or the like can be added to a distal end portion of the ventilator 22b. It is preferred that, as illustrated in FIG. 4, the pipe, the tube 22c, or the like have a shape bent upward.

The breathing device 22 having the extended structure including the ventilator 22b may be arranged in a lower portion of the end surface of the control unit 6. Moreover, for example, the ventilator 22b and the tube 22c may be extended along the vehicle-side harnesses 20b and 21b, or may be fixed together with the harnesses 20b and 21b. Further, when a distal end portion of the tube 22c is extended to an inside of the vehicle body in which there is not a fear of exposure to water, complete waterproofness is achieved. When the tube 22c can be extended to the inside of the cabin, the water-repellant filter 22a of the breathing device 22 is not required.

As a ventilation passage from the breathing device 22 to the inside the electric power steering device 10, in a case of the motor 7, for example, a gap defined between the stator and the rotor or a gap defined between an outer layer of the stator and an inner surface of the motor housing 7a may be used. Moreover, a control CPU, various electric lines, ICs, a drive circuit for the motor windings, and the like are mounted to substrates, relay members, and heatsinks inside the control unit 6. Many spaces are defined between the substrates, the relay members, the heatsinks, and the like, and the case 6a, and an infinite number of ventilation passages thus is present. Therefore, as the ventilation passages inside the control unit 6 and the motor 7, the spaces defined by respective portions can be used.

As described above, the electric power steering device according to the first embodiment has the configuration in which the breathing device is arranged on the outer surface of the case of the control unit. Therefore, while the breathing action of the breathing device effectively functions, the waterproofness can be secured even in an environment in which a pressure difference equal to or larger than that expected according to a standard specification occurs. Moreover, the breathing action of the breathing device can prevent deterioration of the waterproof performance of the electric power steering device.

Further, in the electric power steering device according to the first embodiment, the waterproof structure can be provided by extending the ventilator of the breathing device, and arranging the extension along the harnesses or fixing the extension together with the harnesses. With this configuration, even when the electric power steering device is submerged, the breathing action of the breathing device can be secured. Moreover, when the ventilator of the breathing device is extended, the structure to achieve complete waterproofness of the ventilator is not required. Further, the ventilation passage can be secured through use of a path having suitable shape inside the electric power steering device.

Second Embodiment

Figure 5:
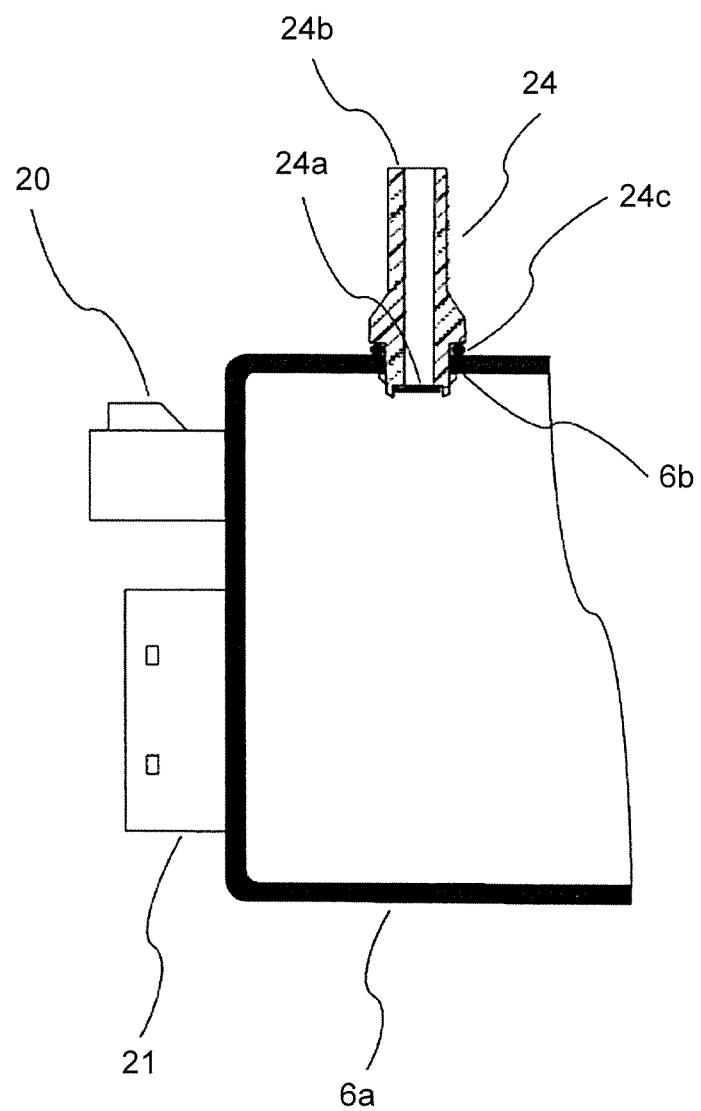
FIG. 5 is a side sectional view for illustrating the control unit side of a main part of the electric power steering device according to a second embodiment of the present invention.

FIG. 5 is a side sectional view for illustrating the control unit 6 side of a main part of the electric power steering device according to a second embodiment of the present invention. In the second embodiment, components of the electric power steering device having the same configuration are denoted by the same reference numerals as those in the first embodiment. Thus, description of those components is omitted, and description is mainly given of different configurations.

In the electric power steering device according to the second embodiment, a breathing device 24 is provided on a side surface of the case 6a, which has a cylindrical case, of the control unit 6. In this configuration, the breathing device is provided separately from the case 6a. Therefore, a mounting hole 6b for mounting the breathing device 24 is formed in the case 6a.

A water-repellant filter 24a is mounted to a lower end portion of the breathing device 24 located inside the control unit 6. The breathing device 24 includes a ventilator 24b extending upward. When the breathing device 24 is inserted into a mounting hole 6b of the case 6a to be mounted, an O-ring 24c is arranged between an outer peripheral wall of the case 6a and a lower portion of the breathing device 24 in order to secure waterproofness between the case 6a and the breathing device 24. Through the insertion of the breathing device 24 into the mounting hole 6b to be mounted, the O-ring 24c is compressed, thereby securing the waterproofness. A waterproof adhesive or a sealing material may be used in place of the O-ring 24c.

The breathing device 24 according to the second embodiment is provided in an upper portion of the side surface of the control unit 6, and the exposure to water of the breathing device 24 thus is less liable to occur. Therefore, the water-repellant filter 24a is not always required. Moreover, in FIG. 5, illustration is given of an example case in which a diameter of the ventilation passage of the ventilator 24b is constant. However, the ventilation passage of the ventilator 24b may be formed so that the diameter thereof increases as the position approaches the water-repellant filter 24a.

In the breathing device 24, in consideration of a resistance in the breathing action, the water-repellant filter 24a has the highest resistance, and a portion causing a resistance is not present in the ventilation passage in the ventilator 24b. Therefore, even when the diameter of the ventilation passage is smaller than the hole diameter at the mounting position of the water-repellant filter 24a, the effect of the breathing action is not reduced.

In the case of the electric power steering device according to the second embodiment, description is given of the configuration in which the breathing device 24 is mounted to the upper portion of the side surface of the control unit 6. However, in place of this configuration, the breathing device 24 may be mounted to an upper portion of the side surface of the motor housing 7a illustrated in FIG. 2. The motor housing 7a incorporates the stator, the motor windings, and the like, and it is thus required to mount the breathing device 24 at a position without interference with these components.

Incidentally, in a case in which the generation of heat on the motor 7 side is large due to the presence of the motor windings and the like, when the breathing device 24 is mounted to the motor housing 7a, the pressure difference between the inside and the outside of the electric power steering device 10 can be promptly eliminated. Moreover, in the case in which the generation of heat on the control unit 6 side is large due to the presence of the CPU and the like, when the breathing device 24 is mounted to the case 6a, the pressure difference between the inside and the outside of the electric power steering device 10 can be promptly eliminated.

In the second embodiment, the ventilation passage at the center of the ventilator 24b extends upward in the form of a chimney also in the breathing device 24 provided separately of the case 6a. With this configuration, the ventilator 24b can be used as a ventilation passage, and the ventilation in the control unit 6 is thus particularly achieved. As a result, a change in pressure inside the electric power steering device can be reduced through use of the breathing action of the breathing device 24, and deterioration of a waterproof function of other portions can also be prevented.

It is preferred that the breathing device 24 according to the second embodiment be arranged in a position as high as possible in the electric power steering device. Moreover, there is given the configuration in which the water-repellant filter 24a is mounted to the lower portion of the ventilator 24b, but the water-repellant filter 24a may be mounted to an upper portion of the ventilator 24b.

Third Embodiment

Figure 6:
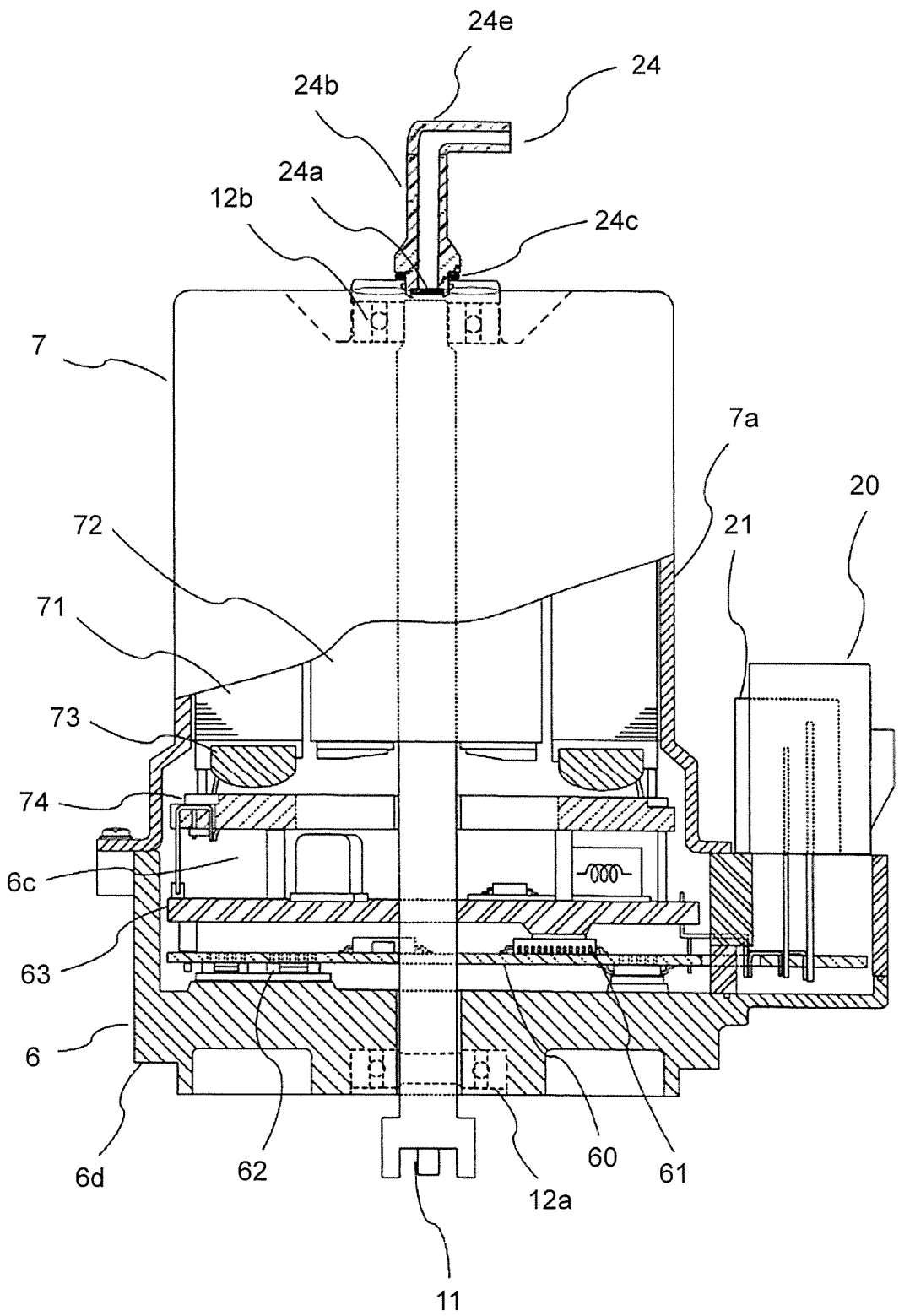
FIG. 6 is a partially cutaway side sectional view for illustrating the basic structure of the electric power steering device according to a third embodiment of the present invention, with an inside thereof being exposed.

FIG. 6 is a partially cutaway side sectional view for illustrating the basic structure of the electric power steering device according to a third embodiment of the present invention, with an inside thereof being exposed. In the third embodiment, components of the electric power steering device having the same configuration are denoted by the same reference numerals as those in the first and second embodiments. Thus, description of those components is omitted, and description is mainly given of different configurations.

In the electric power steering device according to the third embodiment, the breathing device 24 is provided on an end surface of the motor housing 7a of the motor 7. Moreover, the electric power steering device according to the third embodiment is of a type in which the control unit 6 is arranged on the output side of the output shaft 11 of the motor 7.

In the motor 7, as in the related-art type, a rotor 72, a stator 71, and windings 73 are arranged inside the motor housing 7a from the output shaft 11 as a central axis toward an outer side in a radial direction. End portions of the windings are connected by an annular circuit 74, and are further extended to a unit inner portion 6c of the control unit 6. Bearings 12a and 12b are respectively interposed on both of end sides of the output shaft 11. The output shaft 11 can freely be rotated through use of these bearings 12a and 12b.

The control unit 6 includes a housing 6d made of, for example, aluminum, so as to also serve as a heat radiation member. A relay member 63, a control substrate 60, power elements 62, and the like are arranged in the unit inner portion 6c. The relay member 63 is configured to mount wires and components. The control substrate 60 includes electronic components such as the CPU 61 mounted thereon. The power elements 62 are configured to supply currents to the motor windings 73. Moreover, the power supply connector 20 and the signal connector 21 for the electrical connection to the vehicle are arranged so as to protrude from the side surface of the control unit 6.

As described above, in the integrated structure of the motor 7 and the control unit 6 arranged on the output side of the output shaft 11, in some cases, a hole is formed in an end surface of a rear end portion of the motor 7 in order to arrange an axial center of the output shaft 11 with high accuracy.

In view of such cases, in the electric power steering device according to the third embodiment, the breathing device 24 is arranged so as to close this hole. The breathing device 24 itself has basically the same structure as that described in the second embodiment. That is, the breathing device 24 includes the water-repellant filter 24a, the O-ring 24c, and the ventilator 24b. However, in the breathing device 24 according to the third embodiment, an extended ventilator 24e bent upward is provided in a distal end portion of the ventilator 24b. In the drawing of FIG. 6, the extended ventilator 24e is illustrated in a state in which the extended ventilator 24e is bent toward the right side, but this right side corresponds to the upper side in a state in which the motor 7 is actually installed.

When the electric power steering device according to the third embodiment is arranged below the rack shaft 2 illustrated in FIG. 1, it is only required that the extended ventilator 24e of the breathing device 24 be extended to a position close to the rack shaft 2. In this case, even when the electric power steering device is submerged, the breathing action of the breathing device 24 can be secured.

Conversely, when the electric power steering device according to the third embodiment is arranged above the rack shaft 2, the extended ventilator 24e of the breathing device 24 may be extended downward. When the extended ventilator 24e of the breathing device 24 is extended downward, there is an advantage in that entry of dust or foreign matters into the ventilator 24b is significantly rare. Further, ventilation performance can also be improved through elimination of the water-repellant filter 24a depending on a total length of the ventilator 24b and the extended ventilator 24e.

In the third embodiment, there is given the structure in which the hole formed in the end surface of the rear end portion of the motor 7 is used to mount the breathing device 24. The direction of the extended ventilator 24e of the breathing device 24 can be changed in accordance with the arrangement, the waterproof performance, and the like of the electric power steering device. Even in such a case, the breathing action of the breathing device 24 can be secured.

Fourth Embodiment

Figure 7:
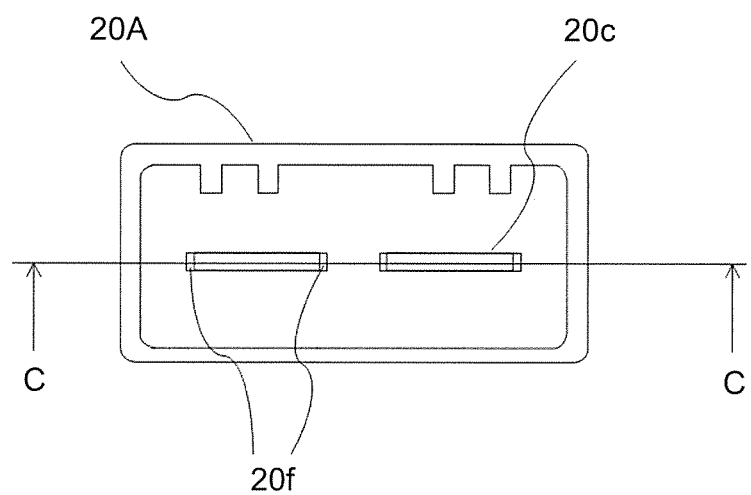
FIG. 7 is a plan view for illustrating a connector provided on an end surface of the control unit of the main part of the electric power steering device according to a fourth embodiment of the present invention.
Figure 8:
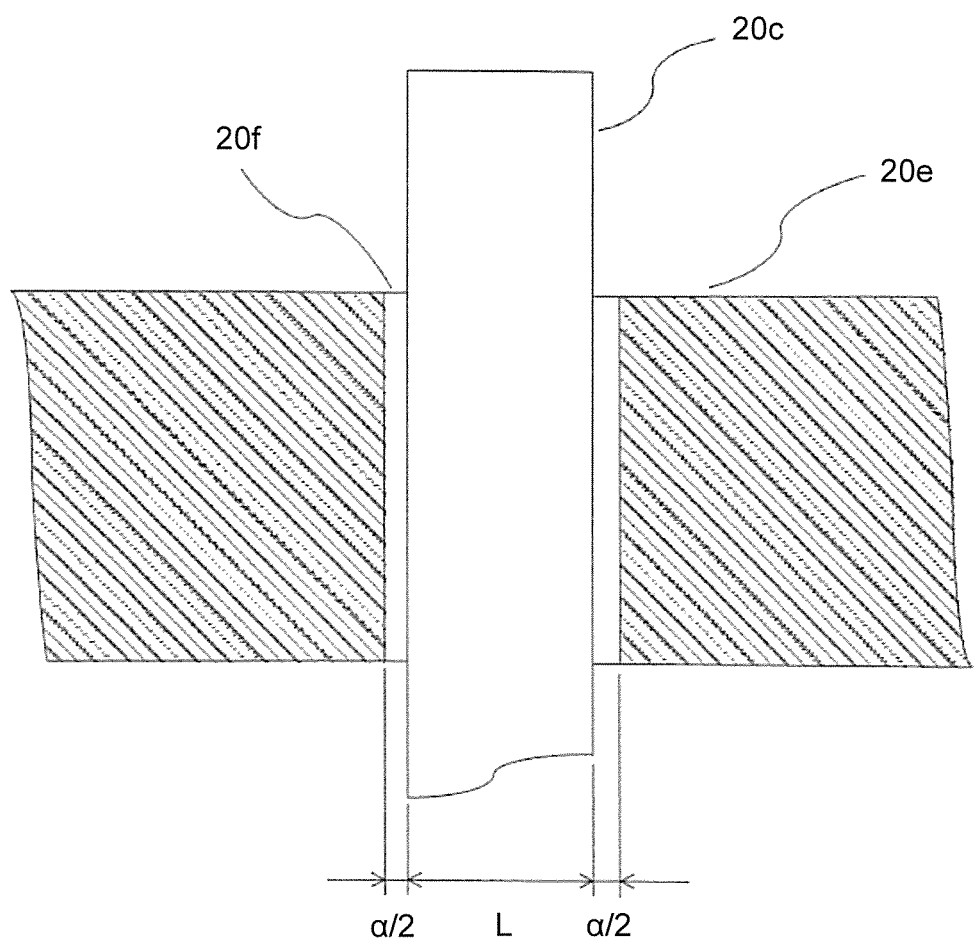
FIG. 8 is a side sectional view for illustrating a part of the connector illustrated in FIG. 7 taken along the line C-C.

FIG. 7 is a plan view for illustrating a power supply connector 20A provided on an end surface of the control unit 6 in a fourth embodiment of the present invention. Moreover, FIG. 8 is a side sectional view for illustrating a part of the power supply connector 20A illustrated in FIG. 7 taken along the line C-C. In the fourth embodiment, components of the electric power steering device having the same configuration are denoted by the same reference numerals as those in the first to third embodiments. Thus, description of those components is omitted, and description is mainly given of different configurations.

In the electric power steering device according to the fourth embodiment, a ventilator is formed of gaps 20f defined between terminals 20c and a connector housing 20e in the power supply connector 20A on the end surface of the control unit 6 on the side opposite to the output shaft 11 of the motor 7. That is, this ventilator functions as the breathing device.

Specifically, the power supply connector 20A illustrated in FIG. 7 has the structure in which two terminals 20c are arranged side by side. Referring to FIG. 7, gaps 20f each having a width narrower than that of the terminal 20c are formed in a widthwise direction of the terminals 20c. Further, referring to FIG. 8, the gaps 20f having the same width are formed on both sides of each of the terminal 20c.

In the power supply connector 20A, the terminals 20c are made of copper, and the connector housing 20e is made of a plastic resin. The connector housing 20e serves to support the terminals 20c. Therefore, contact portions between the terminals 20c and the connector housing 20e have certain amounts of area and length. Therefore, the length of the gaps 20f is long along the terminals 20c, and the gaps 20f can be considered as tubular chimneys.

For example, as illustrated in FIG. 8, the width of the terminal 20c is represented by L, and the half width of the gap 20f is represented by $\alpha/2$. The gaps 20f serve as holes for the breathing. The width of the gap 20f is determined in accordance with the ambient temperature and linear expansion coefficients of respective portions.

Thus, the following representative values are given as specific examples.

Linear expansion coefficient Ec of the copper of the terminals 20c: 16.5 ppm

Linear expansion coefficient Ep of the resin of the connector housing 20e: 100 ppm (polybutylene terephthalate (PBT))

Ambient temperature: −40° C. to normal temperature of 25° C.

Width L of the terminals 20c: 8 mm

Width of the gaps 20f: $\alpha$ (mm)

In consideration of the fact that the width of the gaps 20f decreases as the terminals 20c and the connector housing 20e shrink, it is required to determine the width $\alpha$ of the gaps 20f at the normal temperature. For the determination of the width $\alpha$, the following relational expression (1) is considered.

$$(L+\alpha)(1+Ep^*(-40-25))-L^*(1+Ec^*(-40-25))=65^*L^*(Ec-Ep)+(1-65Ep)^*\alpha$$

In consideration of path resistances and volumes of the control unit 6 and the motor 7, in order to secure a gap 20f=0.1 mm even at low temperature, it is required to satisfy relational expression (1)>0.1 as given by the following.

$$\alpha > 65^*L^*(Ec-Ep)/(1-65^*Ep) > 0.1$$

$$\alpha > 0.095$$

Thus, when approximately 0.1 mm is secured as the width $\alpha$ of the gap 20f, the chimneys are not blocked in the usage environment, and the breathing action given by the ventilator of the breathing device can be secured.

In the fourth embodiment, the gaps 20f configured to promote the breathing action are provided in the vicinities of the terminals 20c of the power supply connector 20A, and the area of the gaps 20f can be determined in consideration of a usage environment temperature of the electric power steering device. As a result, the gaps 20f are used as the chimneys, to thereby be able to secure the breathing action as the breathing device without providing a ventilator as the breathing device separately of the case 6a.

The ventilators of the breathing devices described in the respective embodiments may have any suitable shape, which includes the cases in which the ventilators are extended, as long as the waterproofness of the distal end portions is secured.

REFERENCE SIGNS LIST 1 steering wheel, 2 rack shaft, 3 torque sensor, 4 pinion, 5 tire, 6 control unit, 6a case, 6b mounting hole, 6c unit inner portion, 6d housing, 7 motor (rotating machine), 7a motor housing, 10 electric power steering device, 11 output shaft, 12, 12a, 12b bearing, 13 motor mounting portion, 14 O-ring groove, 16 mounting portion, 20, 20A power supply connector, 20a, 21a vehicle-side connector, 20b, 21b harness, 20c terminal, 20e connector housing, 20f gap, 21 signal connector, 22, 24 breathing device, 22a, 24a water-repellant filter, 22b, 24b ventilator, 22c tube, 24c O-ring, 24e extended ventilator

The invention claimed is:

1. A breathing device, comprising a ventilator, which is provided to an electric power steering device, and is arranged so as to protrude from an inside of the electric power steering device to an outside of the electric power steering device, the ventilator being configured to provide a breathing action through ventilation between the inside and the outside, the electric power steering device being mounted to a vehicle and including a rotating machine and a controller configured to drive the rotating machine, which are integrated with each other so as to have waterproof structure, wherein the ventilator protrudes in a horizontal direction, wherein the breathing action comprises ventilation of at least the rotating machine, wherein the ventilator is formed of a gap defined between a terminal and a connector housing in a connector provided on an end surface of the controller on a side opposite to an output shaft of the rotating machine, wherein the gap is through the connector housing, and wherein, between the terminal and the connector housing, a width of the gap is less than a width of the terminal, and wherein the terminal comprises a first side and a second side both facing the connector housing from within the gap, and wherein the gap is at both of the first side and the second side of the terminal.

2. The breathing device according to claim 1, wherein, between the terminal and the connector housing, the width of the gap is less than half of the width of the terminal.

* * * * *